United States Patent [19]

Gibson

[11] 4,347,547

[45] Aug. 31, 1982

[54] ENERGY INTERLOCK SYSTEM FOR A LINEAR ACCELERATOR

[75] Inventor: Robert Gibson, Walnut Creek, Calif.

[73] Assignee: Siemens Medical Laboratories, Inc., Walnut Creek, Calif.

[21] Appl. No.: 152,486

[22] Filed: May 22, 1980

[51] Int. Cl.³ .................................................. H01H 47/24
[52] U.S. Cl. .................................. 361/187; 361/1; 250/385; 328/233; 378/106
[58] Field of Search ................... 361/187, 1; 250/385, 250/409; 328/233

[56] References Cited

U.S. PATENT DOCUMENTS

| | | | |
|---|---|---|---|
| 3,691,377 | 9/1972 | Matsui et al. | 328/233 |
| 3,808,441 | 4/1974 | Boux | 250/385 |
| 3,936,756 | 2/1976 | Someva et al. | 328/10 |
| 3,942,012 | 3/1976 | Boux | 250/385 |
| 3,955,089 | 5/1976 | McIntyre et al. | 250/385 |
| 3,965,434 | 6/1976 | Helgesson | 328/233 |
| 4,115,830 | 9/1978 | Stieber | |
| 4,142,103 | 2/1979 | Mester et al. | 250/409 |
| 4,144,551 | 3/1979 | Smith et al. | 361/87 X |
| 4,229,704 | 10/1980 | Lewis | 328/233 |
| 4,230,944 | 10/1980 | Wiegman et al. | 250/409 |
| 4,234,793 | 11/1980 | Amtmann | 250/409 |

FOREIGN PATENT DOCUMENTS

| | | | |
|---|---|---|---|
| 1245502 | 7/1967 | Fed. Rep. of Germany | 250/95 |
| 2517139 | 10/1976 | Fed. Rep. of Germany | 250/409 |
| 1944481 | 2/1979 | Fed. Rep. of Germany | 250/409 |
| 139782 | 1/1980 | German Democratic Rep. | 361/1 |
| 455320 | 8/1966 | Japan | 328/233 |
| 50-2759 | 9/1975 | Japan | 328/233 |

OTHER PUBLICATIONS

"Mevatron 20" by Siemens AG, West Germany, Order No. MT 3/1702.101-WS 5791.

"Mevatron 60, Data" by Siemens AG, West Germany, Order No. MT 3-6027.101-PA 9783.

Primary Examiner—J. D. Miller
Assistant Examiner—L. C. Schroeder
Attorney, Agent, or Firm—Spellman, Joel and Pelton

[57] ABSTRACT

The energy interlock system is designed for a linear accelerator having no electron beam bending system. The accelerator emits electron pulses which are directed to a target for generation of X-ray pulses. The interlock system contains an ionization chamber, a discriminator and a switch. The ionization chamber is exposed to the X-ray pulses for measuring their intensity distribution. It comprises a control electrode and a plurality of electrode segments. The discriminator is connected for detecting energy inhomogeneities in the X-ray pulses. The switch is operated by the discriminator and connected to switch the accelerator on and off.

6 Claims, 5 Drawing Figures

ENERGY INTERLOCK SYSTEM FOR A LINEAR ACCELERATOR

BACKGROUND OF THE INVENTION

1. Field of the Invention

This invention relates to an energy monitoring system for the supervision of a particle accelerator, preferably of a linear accelerator. Particularly, this invention relates to an X-ray energy interlock system for an electron linear accelerator of the type having no electron beam bending system which may act as an electron energy band pass.

2. Description of the Prior Art

It is known in the art of radiation systems of various types to switch off the radiation beam via an ionization chamber to which the radiation is applied, as soon as a previously determined dosage of radiation has been reached. Particularly in the case of particle accelerators, such as linear accelerators, it is known to use monitoring systems which control dosage and dosage rate during treatment and which ensure automatic termination of radiation if preset values are exceeded (see brochure "Mevatron 20" by Siemens AG, West Germany, Order No. MT 3/1702.101-WS 5791, particularly see page 9). Such safety interlock systems may be applied in linear accelerators in which the dose rate is uniformly fixed for X-ray irradiation of a single energy, such as to a value of 300 rad/min in the flattened field at 100 cm FD (see brochure "Mevatron 20," supra), or in linear accelerators in which the dose rate is continuously variable between a lower and an upper limit (see brochure "Mevatron 60, Data" by Siemens AG, West Germany, Order No. MT3-6027.101-PA 9783). Such linear accelerators contain a target to generate X-rays and an X-ray flattening filter in the form of a cone shaped metal piece.

From U.S. Pat. No. 4,115,830 is known a monitoring system for the high-voltage supply of an ionization chamber. This system is preferably used for monitoring a particle accelerator. In the field of particle accelerators, it is known to regulate the radiation intensity or radiation output via the ionization current of an ionization chamber subjected to the radiation in such a way that the number of radiation pulses per time unit is changed in correspondence with the chamber signal measured. To overcome inaccuracies in the ionization current measurement below a minimum value of the high voltage supplied to the chamber, the monitoring system is provided. The monitoring system comprises a switch member which is associated with a safety circuit of the particle accelerator and which switches off the latter in the event of insufficient high-voltage.

It is also known in an accelerator to use an interlock system that automatically interlocks the machine according to a signal which represents the homogeneity and/or symmetry of the radiation beam (see, for instance, brochure "Mevatron 20," page 9, supra). Such an interlock system may comprise as a measuring device an ionization chamber of a specific structure, see U.S. Pat. No. 4,131,799. The known ionization chamber has two measuring chambers formed by three mutually parallel walls spaced apart by spacer rings. Two of the three walls have single electrodes arranged thereon, whereas a third wall has several mutually insulated electrodes applied on the measuring side of the wall. The mutually insulated electrodes include a central circular disk-shaped electrode and a group of electrode segments arranged in circular fashion around the central electrode. Such a chamber is especially useful for measuring the intensity distribution of an electron beam. It can also be used for measuring X-rays. In the case of a completely homogeneous radiation intensity in the beam cone, the currents in the measuring electrodes of the chamber are equal. If the currents through the individual equal area measuring electrodes of the ring-shaped arrangement differ, an unsymmetrical distribution of the radiation intensity in the beam cone is indicated. However, if the currents through the individual segment measuring electrodes are equal, but different with respect to the current of the center circular disk-shaped measuring electrode, an inhomogeneity of the radiation intensity in the beam cone is indicated. The beam cone is intended to be symmetrical to the axis of symmetry of the ionization chamber, i.e. to the center of the beam cone.

Accordingly it is desirable to provide another interlock system for a particle accelerator, namely an energy interlock system that interlocks the accelerator in case of undesired energy changes of the radiation output. Such an energy interlock system for X-rays is especially important in a linear accelerator which does not dispose of an electron beam bending system (see, for instance, brochure "Mevatron 60," supra). Such an electron bending system, usually a bending magnet system, commonly works as an energy filter or band pass for accelerated electrons (see, for instance, brochure "Mevatron 20," supra). A linear accelerator of the type having no electron beam bending system may experience a drift of signals from its mechanical and electrical components which leads to an X-ray output energy that is too high or too low for the intended irradiation process. Even though a dose monitoring system and a dose rate monitoring system may be working properly, a patient irradiated by the accelerator should be protected from too high or too low X-ray energies.

Assume, for instance, that a linear accelerator disposes of a dose rate control or servo circuit. If for some reason (for instance drift of components or source variation) the radio frequency power supplied by the HF source of the accelerator should increase, while the output dose rate (in r/min) is kept constant by the dose rate control circuit, the energy of the X-rays would also increase. Such an energy increase has to be stopped, as soon as a preset maximum energy level is reached. The same applies to energies which are too low. A decrease in energy should be stopped, as soon as a preset minimum energy level is reached.

SUMMARY OF THE INVENTION

1. Objects

An object of this invention is to provide an energy monitoring system for the supervision of a particle accelerator.

Another object of this invention is to provide an energy monitoring system for the supervision of a linear accelerator, particularly of a linear accelerator having a flatness filter for X-rays, but no electron beam bending system that works as an energy filter for the accelerated electrons.

Still another object of this invention is to provide an energy interlock system for a linear accelerator that ensures automatic termination of radiation when the X-ray energy exceeds an upper energy level and/or falls below a lower energy level.

It is still another object of this invention to provide an X-ray interlock system for a linear accelerator that is not affected by control circuits of the linear accelerator, such as a dose rate control circuit.

It is still another object of this invention to provide an interlock system for a linear accelerator that is easy to construct and reliable in its function.

Still other objects will become apparent in the course of the following description.

2. Summary

According to this invention, an energy monitoring system for the supervision of a particle accelerator delivering X-ray pulses incorporates measuring means for measuring the intensity distribution in said X-ray pulses, discriminator means for connection to the measuring means and determining energy inhomogeneities in said X-ray pulses, and switch means connected to the discriminator means for superivising the operation of the particle accelerator.

As mentioned above, the information for the energy monitoring system is taken from the intensity distribution of the X-ray pulses. In the case of a linear accelerator, this information may be derived from the X-ray field, which is generated by electrons impinging on a target, after flattening by a flattening filter.

The output signal of the discriminator means may be used as an interlock signal. This interlock signal may be rendered when the energy of the X-rays is above a predetermined maximum value. Particularly, it may also be rendered when the X-ray energy is below a predetermined minimum value.

The interlock signal may, for instance, interlock simultaneously the high voltage of the accelerator, the RF voltage of the HF source and the injection of electrons injected into the accelerator tube by an electron source. By keeping the energy between the maximum and the minimum energy value, the irradiation process can be exactly predetermined by the operator and thus, for instance, an irradiated patient is protected.

BRIEF DESCRIPTION OF THE DRAWINGS

The foregoing and other objects, features and advantages of the invention will be apparent from the following more particular description of the preferred embodiment of the invention, as illustrated in the accompanying drawings.

In the drawings.

DESCRIPTION OF THE PREFERRED EMBODIMENT

Figure 1:
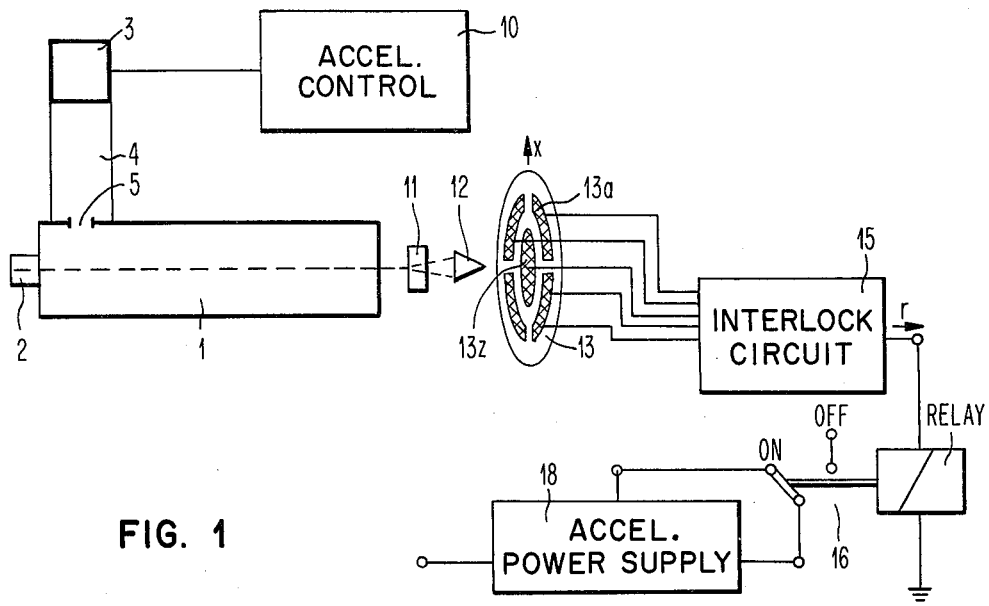
FIG. 1 is a general schematic view of a linear accelerator incorporating the invention.

With reference to FIG. 1, a linear accelerator is shown comprising a conventional wave guide 1 for accelerating electrons. The wave guide 1 is adapted to receive the electrons to be accelerated on one side from an electron emitting and injection device, which is referred to as electron gun 2. The wave guide 1 may consist of a hollow tube into which is introduced an electromagnetic wave from a suitable high frequency or radio frequency source 3 via a coupling or introducing element 4 and an output window 5.

The source 3 of high frequency energy may embody a high frequency oscillator, such as a magnetron or klystron. The oscillator is of the type which comprises adjustment devices that can be set by electrical signals. These devices, which can be of any well-known type, are controlled by an accelerator control circuit 10. The control circuit 10 is also of a kind well-known in the art. It includes for instance a dosage rate control circuit and a high frequency control circuit.

Electrons introduced into the wave guide 1 via the electron gun 2 are accelerated at high energy by the electromagnetic wave inside the wave guide 1. A pulsed stream of accelerated electrons emerges from the delivery end of the wave guide 1 and arrives at a target 11. In the target 11, X-rays are generated. The X-rays are directed to a flattening filter 12 of conventional design. The filter 12 comprises essentially a cone shaped metal piece. A measuring device 13 is located behind the filter 12 to measure the distribution of the X-rays.

It should be noted that no beam bending system is used. Conventionally such a bending system is arranged at the delivery end of the accelerator for bending the beam of accelerated electrons at a desired angle. Thus the conventional bending magnet system acts as an energy band pass for accelerated electrons.

The measuring device 13 is in particular an ionization chamber or an X-ray dose chamber for analyzing inhomogeneities in the X-rays. It may be of a well-known type, see for instance U.S. Pat. No. 4,131,799, containing a centrally located and conducting circular disk-shaped plate or measuring electrode $13z$ and four individual measuring electrodes $13a$, $13b$, $13c$, $13d$ of equal size which are grouped around the central electrode $13z$ in an arcuate segment-like fashion. The electrodes $13a$, $13b$, $13c$, $13d$ may be elongated curved segments. The X-ray striking the electrodes produce electrical current outputs proportional to the intensity and distribution of the rays or beam. The currents of all electrodes $13z$ and $13a$, $13b$, $13c$, $13d$ are introduced into an interlock circuit 15 for further processing.

Figure 2:
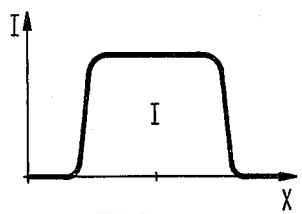
FIG. 2 is a diagram of the X-ray intensity distribution in front of an inhomogeneity and flatness ionization chamber contained in FIG. 1 when the X-ray energy is adjusted correctly.
Figure 3:
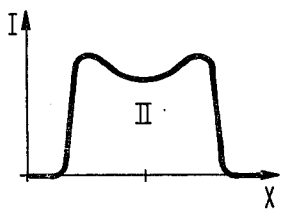
FIG. 3 is the corresponding intensity distribution diagram when the X-ray energy is too low.
Figure 4:
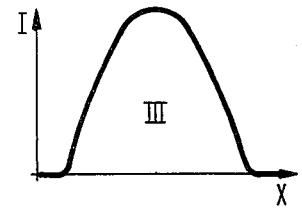
FIG. 4 is the corresponding intensity distribution diagram when the X-ray energy is too high.

Generally speaking, the measuring device 13 is such that the X-rays are investigated for their intensity distribution in a plane perpendicular to their main axis. Three intensity distributions I, II and III are shown in FIGS. 2–4, respectively. They show the local intensity distribution along an axis x (FIG. 1). It should be noted that the curve I has a flat top. The flatness or nature and extent of curvature of the top of the intensity curve is of particular interest for the illustrated interlock system. It will be noted that in the curves II and III non-even intensity distributions prevail. If the electron energy changes, the flat top part of the curve I will change. It will become either concave (see pulse II) or convex (see pulse III). This change of "flatness" is the basis for the further signal processing. Curve II corresponds to a too low energy, and curve III corresponds to a too high energy.

The interlock circuit 15 contains means for measuring the "flatness" of the top of the curves I–III. The interlock circuit 15 contains in particular a discriminator which determines if the tops deviate from the "optimal flatness" (curve I) by predetermined values.

If the flatness signal exceeds the predetermined value preset in the discriminator, the discriminator changes its output signal r and activates a switch member 16. The switch member 16 is shown as a relay, the switch are of which controls the ON and OFF position of the power supply 18 for the linear accelerator. The switch member 16 will switch off the power supply 18 in the event of an unwanted deviation from the "optimum flatness," i.e. of an insufficient and/or too high X-ray energy. This will be explained in more detail when FIG. 5 will be discussed. Switching off of the power supply 18 is a measure for the patient's safety. It protects the patient treated by the X-ray field against an X-ray energy that is too low and also against an X-ray energy that is too high.

It should be mentioned that the invention is not limited to switching off the power supply 18 of the accelerator by means of the interlock circuit 15 and the switch member 16. Instead, the switch member 16 can also turn off the RF voltage of the HF power source 3 and/or the emission of electrons of the electron gun 2, or switch off the accelerator in a different way.

Thus, the combination of the measuring device 13, of the interlock circuit 15, and of the switch member 16 provides supervising the proper treatment of a patient.

Figure 5:
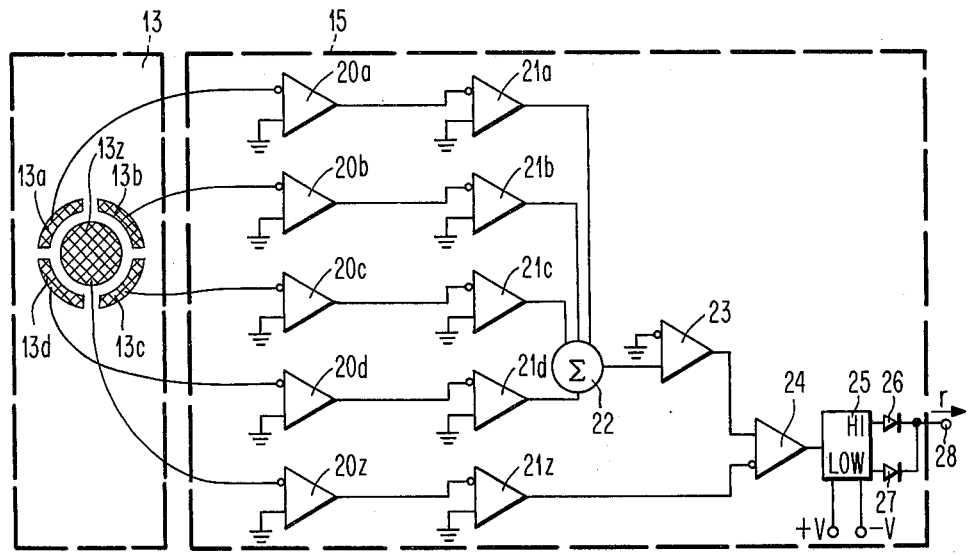
FIG. 5 is an embodiment of a dose chamber and an energy interlock circuit which can be used in the accelerator of FIG. 1.

In FIG. 5 is shown a preferred embodiment of the interlock circuit 15. This circuit 15 delivers an interlock output signal r (and thus interlocks the linear accelerator) when the energy of the X-rays is above a predetermined upper value, and also when the energy of the X-rays is below a predetermined lower value. As long as the energy is kept between these two predetermined energy limits, no switch-off operation occurs.

According to FIG. 5, the interlock circuit 15 contains a series of preamplifiers 20a, 20b, 20c, 20d and 20z the inputs of which are connected to the electrodes 13a, 13b, 13c, 13d and 13z, respectively. Their outputs are connected to the inputs of amplifiers 21a, 21b, 21c, 21d and 21z, respectively. The outputs of the four amplifiers 21a, 21b, 21c and 21d are connected to a summation unit 22. The output of the summation unit 22 is connected to the input of an additional amplifier 23. A differential amplifier 24 receives the output signals from the amplifier 23 on the one hand and from the amplifier 21z on the other hand for comparison. The output signal of the differential amplifier 24 is indicative for the flatness or equal distribution of the X-rays received by the measuring device 13. This output signal is fed to a window comparator 25, which allows for setting an upper end a lower limit by introducing voltages V+ and V− of opposite polarity. The outputs of the comparator 25 are connected via diodes 26 and 27 to a common output 28. The output 28 delivers the interlock signal r.

Assume that the energy of the X-rays emitted by the linear accelerator has changed to a value that does not correspond to a preset value. Assume that the actual value is smaller than the optimized value. In such a case the distribution of X-rays is no longer essentially uniform along the line x (see FIG. 1) which is perpendicular to the main propagation direction. The X-ray distribution curve will show smaller values in the middle section than in both side sections. Therefore, electrode 13z will supply a smaller current than the four electrodes 13a, 13b, 13c, 13d combined. The combined current is determined by the summation unit 22. The comparator 24 will indicate by the polarity of its output signal that the output signal from the summation unit 22 is higher than the output signal from the amplifier 21z. If the output signal of comparator 24 exceeds the voltage V+, the diode 26 will transmit a signal to the output 28 which will be used for interlock purposes. However, if the output signal of comparator 24 does not exceed the voltage V+, zero signal will be present at output 28 indicating that the energy of the X-rays corresponds to the preset value and that no forced shut off is necessary.

While the energy interlock system described above constitutes a preferred embodiment, it is to be understood that a variety of changes may be made without affecting the range and scope of this invention.

What is claimed is:

1. An X-ray energy monitoring system for the supervision of a linear accelerator of the type having no electron beam bending system, said accelerator emitting electron pulses which are directed to a target for generation of X-ray pulses, comprising in combination:
    (a) a flattening filter exposed to said X-ray pulses for flattening the intensity distribution of X-ray pulses transmitted therethrough such that said intensity distribution contains a flat middle portion when the energy of said X-ray pulses is adjusted correctly;
    (b) an ionization chamber for measuring the intensity distribution of said transmitted X-ray pulses;
    (c) discriminator means connected to said ionization chamber for determining flatness deviations in the intensity distributions of said transmitted X-ray pulses, each such flatness deviation being an indication of a change of said correctly adjusted X-ray energy; and
    (d) switch means operated by said discriminator means dependent upon said flatness deviations, for interlocking the operation of said linear accelerator.

2. The X-ray energy monitoring system according to claim 1, wherein said switch means is connected to interlock the high voltage source of said accelerator.

3. The X-ray energy monitoring system according to claim 1, wherein said switch means is connected to interlock the high frequency voltage source of said accelerator.

4. The X-ray energy monitoring system according to claim 1, wherein said switch means is connected to interlock the electron source of said accelerator.

5. The X-ray energy monitoring system according to claim 1, wherein said ionization chamber includes a central electrode and a plurality of electrode segments arranged around said central electrode, and said discriminator means comprise a comparator for comparing the combined output signals of said electrode segments with the output signal of said central electrode, and wherein said discriminator further comprises a window comparator which is connected to the output of said comparator.

6. The accelerator according to claim 5, wherein said window comparator is supplied by two signals for determination of an upper and a lower limit.

* * * * *